April 8, 1958     H. SEBELL     2,829,813
WRITING BOARD AND HOLDER FOR VEHICLES
Filed June 25, 1956

INVENTOR.
HARRY SEBELL
BY
Richard von K. Bruma
Atty.

United States Patent Office 2,829,813
Patented Apr. 8, 1958

2,829,813

WRITING BOARD AND HOLDER FOR VEHICLES

Harry Sebell, Syracuse, N. Y.

Application June 25, 1956, Serial No. 593,638

4 Claims. (Cl. 224—42.1)

This invention relates generally to accessories for motor vehicles, and has particular reference to a novel writing arrangement for use in an automobile which arrangement includes a writing board and a holder or rack for supporting the board in a convenient yet out of the way location when it is not in use.

A great many automobile users have frequent need to jot down notes and memoranda or even write short reports while seated in their parked vehicles. This is particularly true of salesmen of all kinds whose cars often serve as an office while they are on the road away from the home plant. On many occasions, it is necessary for these people to make notes or to complete orders immediately after each sales call, since too many calls are made in the course of a day to wait until evening and then try to make out detailed reports on the day's business.

Since the average automobile is not designed for writing comfort and is not provided with any convenient writing surface, the necessity of using it for this purpose is an inconvenience and a source of annoyance to many people. Accordingly, it is the primary object of the present invention to provide a practical writing arrangement for automobile use which includes a convenient and adequate writing surface and means to store said writing surface so that it is completely out of the way of the driver and other occupants of the vehicle when not in use, but is readily accessible whenever needed.

Another important object of the invention is to provide a writing arrangement for automobile use wherein the writing surface forming a part thereof is sufficiently large to enable the user to write thereon in a comfortable, uncramped manner.

A further important object of the invention is to provide a writing arrangement for automobile use wherein the writing surface is detachably mounted in a convenient position on the automobile steering wheel when in use.

A still further important object of the invention is to provide a writing arrangement for an automobile wherein the writing surface is stored at the top of the car when not in use so that it is out of the way of the driver and other occupants, and yet is always within easy reach from any seat in the car.

Another important object of the invention is to provide a writing arrangement for automobile use wherein the writing surface can be quickly and easily engaged with and disengaged from its storage holder or rack.

Still another object of the invention is to provide a writing arrangement for an automobile wherein the holder for storing the writing surface when not in use is readily attached to any make or model of car, the holder being freely adjustable to compensate for structural differences therein.

A further object of the invention is to provide a writing arrangement for an automobile wherein the holder for storing the writing surface requires no special fittings or fastenings to secure it to the car and can be attached thereto or removed therefrom without damage to the car or its upholstery.

A still further object of the invention is to provide a writing arrangement for an automobile which is strong and durable and at the same time is of simple, inexpensive construction.

Other objects and advantages of the invention will become apparent from the following detailed description thereof read in conjunction with the accompanying drawings which illustrate a representative embodiment of the invention for the purpose of disclosure.

Figure 1:
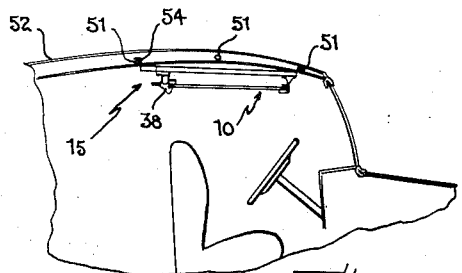
Figure 1 is a diagrammatic side elevation of an automobile, partially in section, showing the location in the automobile of a writing arrangement embodying the invention when the writing board is not in use.

Having reference now to the drawings, wherein like reference numbers designate the same parts in each of the views, 10 generally indicates the writing board contemplated by the invention, which board is substantially rectangular in shape and is preferably formed of masonite or some other equally thin but rigid material such as plywood or metal. The writing surface of the board 10 is perfectly flat and, when in use, it is adapted to overlie the vehicle steering wheel, its length being somewhat greater than the wheel diameter to provide a sufficiently large surface to enable the user to write upon it comfortably. In order to maintain the writing board 10 in a steady position on the wheel, the board is provided on its under side 11 with a strap 12 of elastic material which is secured as by rivets 14 to the board, the strap being slipped under the wheel to hold the board in close engagement therewith. Strap 12 is preferably a rubber, fabric composition which limits the amount of its elasticity and insures a long life without undue stretching.

When the board 10 is not being used as a writing surface it is removed from the steering wheel and stored in an unobtrusive location adjacent the top of the car where it is supported by means of a special holder or rack indicated generally at 15. The holder 15, which is secured to the car in a manner to be presently described, is comprised of a pair of separable frame members 17, 18 which are normally held together by a frictional interlocking of their parts. The frame member 17 is formed of a pair of substantially parallel channel elements 20 which are secured together and maintained in properly spaced relation by cross pieces 21, 22 affixed to the channels as by spot welding. The frame member 18 is formed of corresponding parallel channel elements 24 which are secured together at one end of the frame only by a welded cross piece 25. The channel elements 24 are smaller in cross section than the elements 20 and fit therewithin in a friction tight manner to secure the frames together as above noted. See Figures 3, 5.

Figure 3:
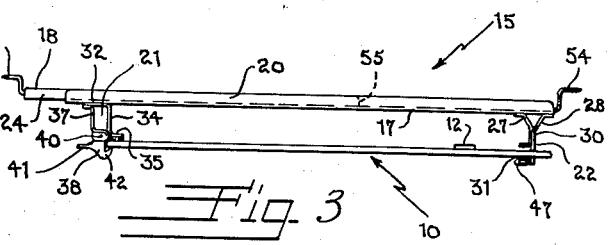
Figure 3 is an enlarged side elevation of the writing board and holder therefor.

The cross piece 22 on the frame member 17 may in actual practice consist of 2 sheet metal strips 27, 28 welded together as at 30, the strips diverging at their upper ends where they are attached to the channel elements 20 and being turned inwardly in spaced parallel relation to one another at their lower ends so that they form a horizontal channel or bracket 31 to receive one edge of the writing board 10. The cross piece 21 on the frame member 17 is formed with an upper horizontal portion 32 which is attached to the channel elements, a downwardly extending portion 34 and a lower, inwardly turned horizontal portion 35. Secured to the piece 21 at its mid point is a small bracket 37 upon which is mounted a spring catch 38 of conventional design, the catch being rockable about the pivot point 40 by means of a finger tab 41. Catch 38 is normally spring biased into the position shown in Figures 3 and 5 with its nose portion 42 overlying the lower horizontal portion 35 of the cross piece 21 to hold the opposite edge of the writing board thereagainst as shown in Figure 3.

Figure 4:
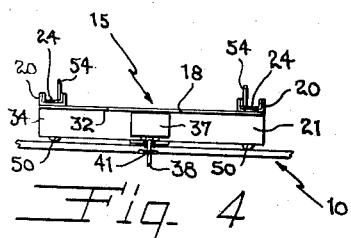
Figure 4 is an enlarged end elevation of the board and holder.
Figure 5:
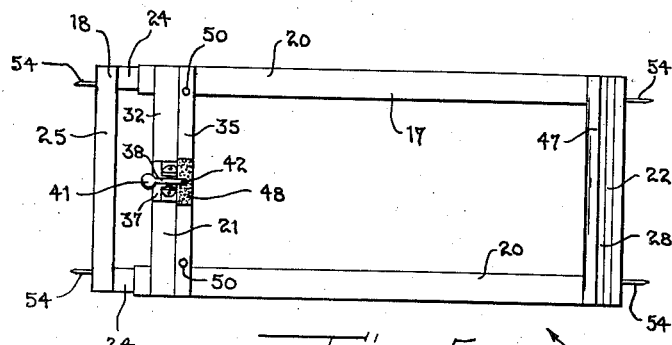
Figure 5 is an enlarged bottom plan view of the holder alone.
Figure 6:
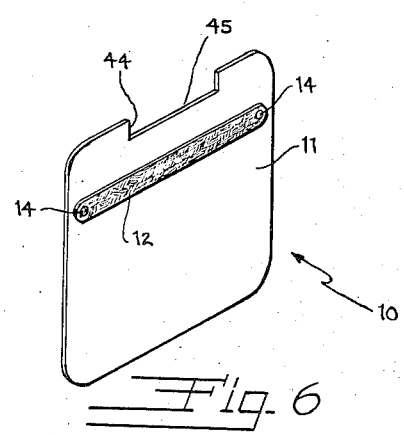
Figure 6 is a perspective view of the back or under side of the writing board.
Figure 7:
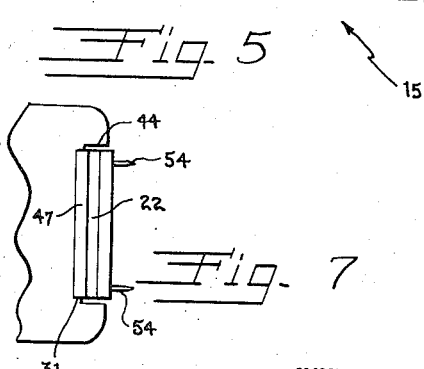
Figure 7 is a fragmentary bottom plan view showing the interengagement of the board with the bracket on the holder.

As may be seen in Figures 6 and 7, the writing board 10 is formed with a centrally disposed cut-away area 44 at its upper edge, the length of this area being slightly longer than the length of the bracket 31. The purpose of this arrangement is to permit the indented edge 45 of the board to be received in the bracket as shown in Figure 7 whereby lateral movement of the board is prevented when it is mounted in the holder. After the edge 45 of the board has been positioned in the bracket 31, the opposite edge is simply pushed against the nose of the catch 38 which rocks back sufficiently to let the board pass and then snaps into engagement therewith. Conversely, when it is desired to remove the board from the holder, the catch is simply rocked in a clockwise direction, Figure 3, by means of its finger tab to release the rear edge of the board which may then be easily withdrawn from the bracket 31. In order to prevent the board from rattling while mounted in the holder, bracket 31 is provided with a rubber guard or cover 47, and a piece of sponge rubber 48 is secured to the cross piece 21 beneath the catch 38. In addition, small rubber bumpers 50 are secured to the portion 35 of the cross piece, as best shown in Figures 4 and 5.

Figure 2:
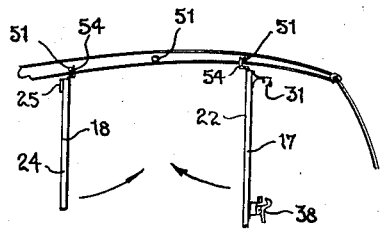
Figure 2 is a view corresponding to Figure 1 showing the manner in which the writing board holder or rack is secured to the automobile.
Figure 8:
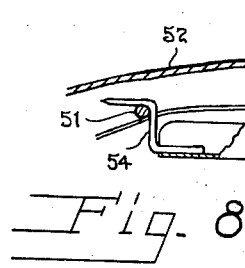
Figure 8 is an enlarged detail view showing the holder securing means in engagement with the automobile top structure.

As previously noted, the holder itself is preferably secured to the top of the car, and it has been found that the best location is over the middle of the front seat, within easy reach from the driver's seat in particular, but also from other seats in the car. Every hard top automobile is constructed with transversely extending wires or rods 51 beneath its metal top 52 to which the overhead upholstery is secured. These rods are normally spaced from 9 to 12 inches apart over the driver's seat although they are closer together adjacent the rear of the top where the curvature is the greatest. The present invention utilizes these wires 51 to support the writing board holder and, to this end, the outer ends of the frame members 17, 18 are provided with offset pin elements 54 which are projected through the upholstery and hooked over the wires as is best shown in Figures 1 and 8. To do this, the frame members are separated, and each is held as shown in Figure 2 so that the pins 54 can be thrust vertically through the upholstery directly adjacent the wires. The frames are then swung upwardly towards one another which causes the pins to hook over the wires and brings the frames into engagement so that the channel elements thereof may be frictionally interlocked as shown in Figures 1 and 3.

The holder is then securely attached to the car, although it can be easily removed at any time by simply pulling the frame members 17, 18 apart and disengaging their pins from the wires. The pins are sufficiently small so that they do not damage the upholstery, the small holes left thereby being hardly noticeable. The frame members are normally attached to a pair of alternate wires 51 as indicated in Figure 2, and variations between the spacing of these wires in different makes and models of cars are compensated for by the fact that the channel elements 20, 24 can interengage at any point along their lengths, with a large amount of variation being permissible as is indicated by the overlapping of the channels shown at 55 in Figure 3.

From the foregoing description it will be apparent that this invention provides a novel and highly practical writing arrangement for automobile use. The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. A holder for supporting a writing board in an automotive vehicle when the board is not in use comprising a pair of separable interlocking frame members, offset pin members on each of said members to detachably secure it to the top of the vehicle interior, said members being individually secured to the top and then joined together to form said holder, and means on one of said frame members including a bracket and a releasable catch to secure said board thereto.

2. In an accessory for an automotive vehicle, said vehicle having means adjacent its top for securing the interior top upholstery thereto, a holder for supporting a writing board adjacent the top of the vehicle when the board is not in use comprising a pair of separable interlocking frame members, each of said frame members including a pair of substantially parallel channel elements and a cross-piece to secure said elements together, the channel elements for one of said members having a smaller cross-section than the channel elements for said other member and fitting tightly therewithin to normally secure the members together, offset pin elements at one end of each of said frame members engageable with the top upholstery securing means to detachably secure the members thereto, and means on one only of said frame members to secure the writing board thereto.

3. An accessory as defined in claim 4 together with resilient means on said bracket and adjacent said releasable catch to prevent said board from rattling when the vehicle is in motion.

4. In an accessory for an automotive vehicle, said vehicle having means connected to its top for securing the interior top upholstery thereto, a holder for supporting a writing board adjacent the top of the vehicle interior when the board is not in use comprising a pair of separable frame members, each of said frame members including a pair of substantially parallel channel elements and a cross piece to secure said elements together, the respective channel elements of said frame members being frictionally engageable to normally secure the members together, offset pin elements at one end of each of said frame members engageable with the top upholstery securing means to detachably secure the members thereto, and means on one of said frame members including a bracket and releasable catch to secure the writing board thereto.

References Cited in the file of this patent
UNITED STATES PATENTS

| | | |
|---|---|---|
| 1,894,559 | Fisher | Jan. 17, 1933 |
| 2,253,423 | Fellers et al. | Aug. 19, 1941 |
| 2,520,051 | Newland | Aug. 22, 1950 |